(12) United States Patent
Lin et al.

(10) Patent No.: US 11,262,322 B2
(45) Date of Patent: Mar. 1, 2022

(54) THERMAL INSULATION PROPERTY MEASURING DEVICE

(71) Applicant: Dalian University of Technology, Dalian (CN)

(72) Inventors: Yan Lin, Dalian (CN); Xiaoning Jiang, Dalian (CN); Tieli Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/993,299

(22) Filed: Aug. 14, 2020

(65) Prior Publication Data
US 2021/0285903 A1 Sep. 16, 2021

(30) Foreign Application Priority Data
Mar. 10, 2020 (CN) .......................... 202010161974.3

(51) Int. Cl.
*G01K 1/00* (2006.01)
*G01K 13/00* (2021.01)
*G01K 7/00* (2006.01)
*G01N 25/00* (2006.01)
*G01N 25/18* (2006.01)

(52) U.S. Cl.
CPC .................................. *G01N 25/18* (2013.01)

(58) Field of Classification Search
USPC .................. 374/208, 141, 110, 166, 143, 43
See application file for complete search history.

(56) References Cited

U.S. PATENT DOCUMENTS

2019/0383786 A1* 12/2019 Hugghins ............... E21B 25/00
2021/0164928 A1*  6/2021 Lubinski ............ G01N 29/2418

* cited by examiner

*Primary Examiner* — Mirellys Jagan
(74) *Attorney, Agent, or Firm* — Matthias Scholl P.C.; Matthias Scholl (57) ABSTRACT

A thermal insulation property measuring device, including a tank, a thermal insulator, a cuboidal frame, a support bracket, and a data collector. The tank includes an upper body, a first lower body, and a second lower body. The thermal insulator includes a first thermal insulation layer, a second thermal insulation layer, a first membrane, a second membrane, and a third membrane. The support bracket includes a trapezoidal support and a transition support. The tank is disposed on the support bracket. The support bracket is disposed in the cuboidal frame. The upper body, the first lower body, and the second lower body are spherical and communicate with each other. A filling tube, a pressure relief tube and a piezometer tube are disposed on the upper body. The first membrane is disposed on the tank. The first thermal insulation layer is coated on the first membrane.

4 Claims, 11 Drawing Sheets

FIG. 14

THERMAL INSULATION PROPERTY MEASURING DEVICE

CROSS-REFERENCE TO RELATED APPLICATIONS

Pursuant to 35 U.S.C.§ 119 and the Paris Convention Treaty, this application claims foreign priority to Chinese Patent Application No, 202010161974.3 filed Mar. 10, 2020, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a thermal insulation property measuring device.

SUMMARY

The disclosure provides a thermal insulation property measuring device. The device comprises a tank, a thermal insulator, a cuboidal frame, a support bracket, and a data collector. The tank comprises an upper body, a first lower body, and a second lower body. The thermal insulator comprises a first thermal insulation layer, a second thermal insulation layer, a first membrane, a second membrane, and a third membrane. The support bracket comprises a trapezoidal support and a transition support.

The tank is disposed on the support bracket; the support bracket is disposed in the cuboidal frame; the upper body, the first lower body, and the second lower body are spherical and communicate with each other; the thermal insulator is disposed on the tank; a filling tube, a pressure relief tube and a piezometer tube are disposed on the upper body.

The first membrane is disposed on the tank; the first thermal insulation layer is coated on the first membrane; the second membrane is coated on the first thermal insulation layer; the second thermal insulation layer is coated on the second membrane; and the third membrane is coated on the second thermal insulation layer.

The cuboidal frame comprises a first rectangular frame, a second rectangular frame, four angle steels connecting the first rectangular frame and the second rectangular frame, a base plate disposed below the second rectangular frame, four jacks respectively disposed on four corners of the second rectangular frame, and a ladder disposed between the first rectangular frame and the second rectangular frame; the second rectangular frame comprises a transverse H-shaped beam and a longitudinal H-shaped beam; the transition support is disposed on the transverse H-shaped beam; the trapezoidal support is disposed on the transition support; the tank is disposed on the trapezoidal support.

The data collector comprises a table, a computer disposed on the table, a first hub, a second hub, a weighing machine, a camera, a pressure gauge, a thermometer, and a plurality of temperature sensors; the first hub, the camera, the pressure gauge, and the thermometer are disposed on the first rectangular frame; the weighing machine is disposed below the second rectangular frame; the plurality of temperature sensors is secured to the first membrane and the second membrane; the pressure gauge, the thermometer, and the plurality of temperature sensors are connected to the first hub; the weighing machine and the first hub are connected to the second hub; the second hub is connected to the computer; and the pressure gauge is connected to the piezometer tube.

A plurality of step joints are disposed in the first thermal insulation layer and the second thermal insulation layer; the plurality of step joints each comprises a cavity filled with a filler; the first thermal insulation layer comprises multilayered materials; the second thermal insulation layer comprises an impact resistant material; the second membrane comprises a thin film material; the third membrane comprises a tarpaulin; a fence is disposed on the upper body of the thermal insulator; one end of the filling tube, one end of the pressure relief tube and one end of the piezometer tube are disposed in the fence; and a filling valve, a pressure relief valve, a safety valve disposed in the fence are connected to the filling tube, the pressure relief tube and the piezometer tube, respectively.

The first rectangular frame comprises two transverse steel plates and two longitudinal steel plates; the second rectangular frame comprises two longitudinal H-shaped beams and two transverse vertical plates; the transverse H-shaped beam is disposed between the two longitudinal H-shaped beams; the four angle steels each comprise a plurality of bolt holes; and four toughened transparent glass plates are fixed on four facades of the cuboidal frame via the bolt holes.

The trapezoidal support comprises a plurality of cemented hardwood blocks; the transition support comprises wood or hard plastics; and the transition support comprises a faceplate, a baseboard, and a plurality of vertical plates disposed between the faceplate and the baseboard.

In the drawings, the following reference numbers are used: 1. Tank; 2. Thermal insulator; 3. Cuboidal frame; 4. Support bracket; 5. Data collector; 10. Upper body; 11. First lower body; 12. Second lower body; 13. Filling valve; 14. Pressure relief valve; 15. Safety valve; 16. Filling tube; 17. Pressure relief tube; 18. Piezometer tube; 20. First thermal insulation layer; 21. Second thermal insulation layer; 22. Step joint; 23. First membrane; 24. Second membrane; 25. Third membrane; 26. Fence; 30. Transverse steel plate; 31*a*. Longitudinal H-shaped beam; 32. Transverse vertical plate; 33. Angle steel; 34. Ladder; 35. Base plate; 36. Jack; 37. Toughened transparent glass plate; 40. Trapezoidal support; 41. Transition support; 41*a*. Faceplate; 41*h*. Baseboard; 41*e*. Vertical plate; 50. Computer; 50*a*. First hub; Sob. Second hub; 50*c*. Threading pipe; 50*d*. Table; 51. Weighing machine; 51*a*. Weight signal wire; 52. Camera; 52*a*. Video antenna; 53. Pressure gauge; 53*a*. Pressure signal wire; 54. Thermometer; 54*a*. Temperature signal wire; 55. Temperature sensor; 55*a*. First group of signal wires; 55*b*. Second group of signal wires.

DETAILED DESCRIPTION

To further illustrate the disclosure, embodiments detailing a thermal insulation property measuring device are described below. It should be noted that the following embodiments are intended to describe and not to limit the disclosure.

Figure 1:
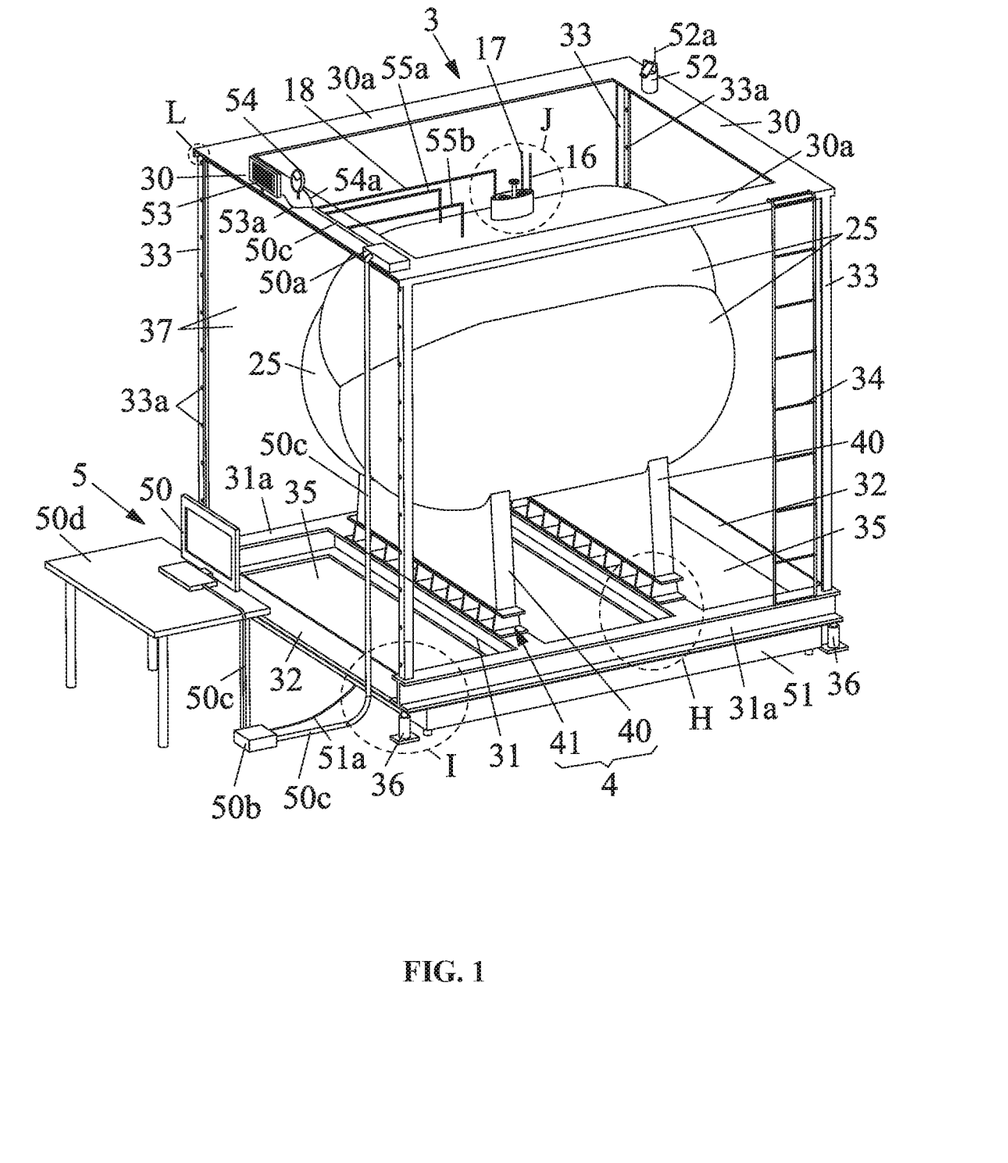
FIG. 1 is a schematic diagram of a thermal insulation property measuring device in accordance with one embodiment of the disclosure.
Figure 7:
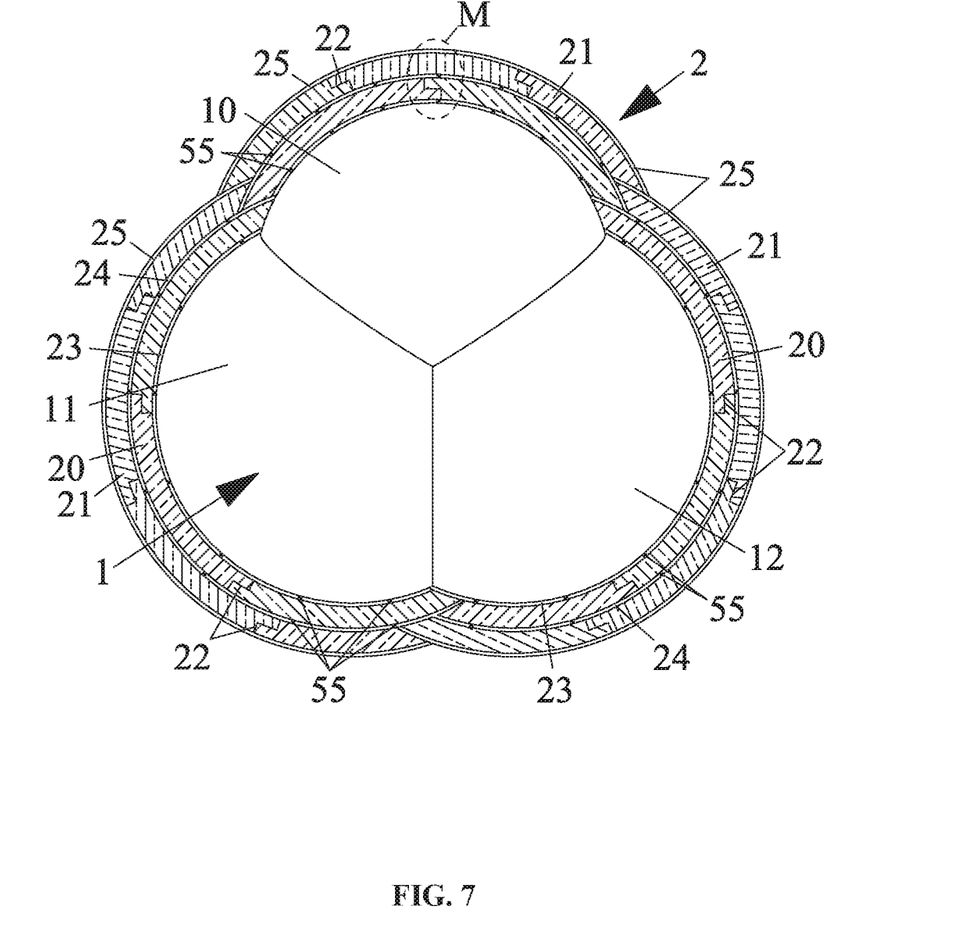
FIG. 7 is a sectional view of a thermal insulator in FIG. 1.

As shown in FIGS. 1, and 7, the thermal insulation property measuring device comprises a tank 1, a thermal insulator 2, a cuboidal frame 3, a support bracket 4, and a data collector 5. The thermal insulator 2 is disposed on the tank 1. The tank 1 is disposed on the support bracket 4; the support bracket is disposed in the cuboidal frame 3. The data collector 5 is configured to collect and analyze the data information.

Figure 2:
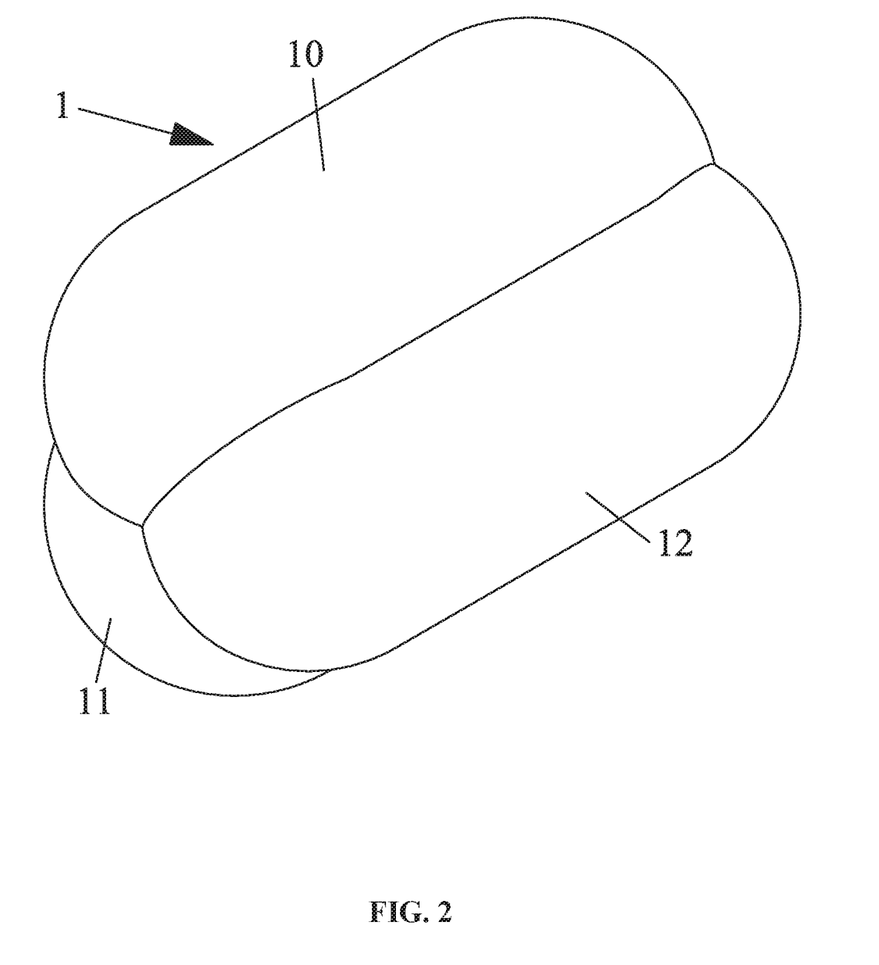
FIG. 2 is a schematic diagram of a tank in FIG. 1.
Figure 3:
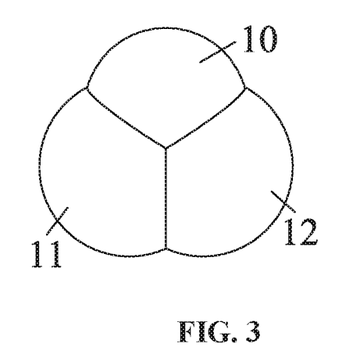
FIG. 3 is a front view of a tank in FIG. 1.
Figure 4:
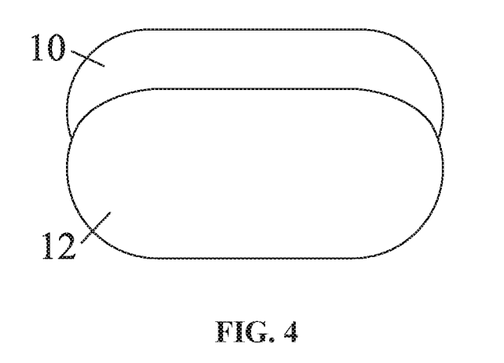
FIG. 4 is a side view of a tank in FIG. 1.
Figure 5:
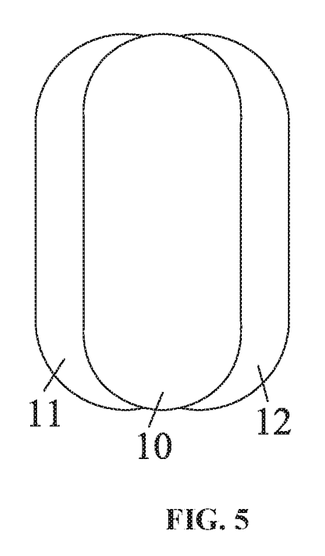
FIG. 5 is a top view of a tank in FIG. 1.
Figure 6:
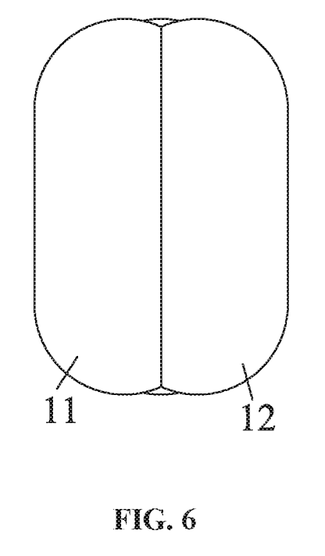
FIG. 6 is a bottom view of a tank in FIG. 1.
Figure 11:
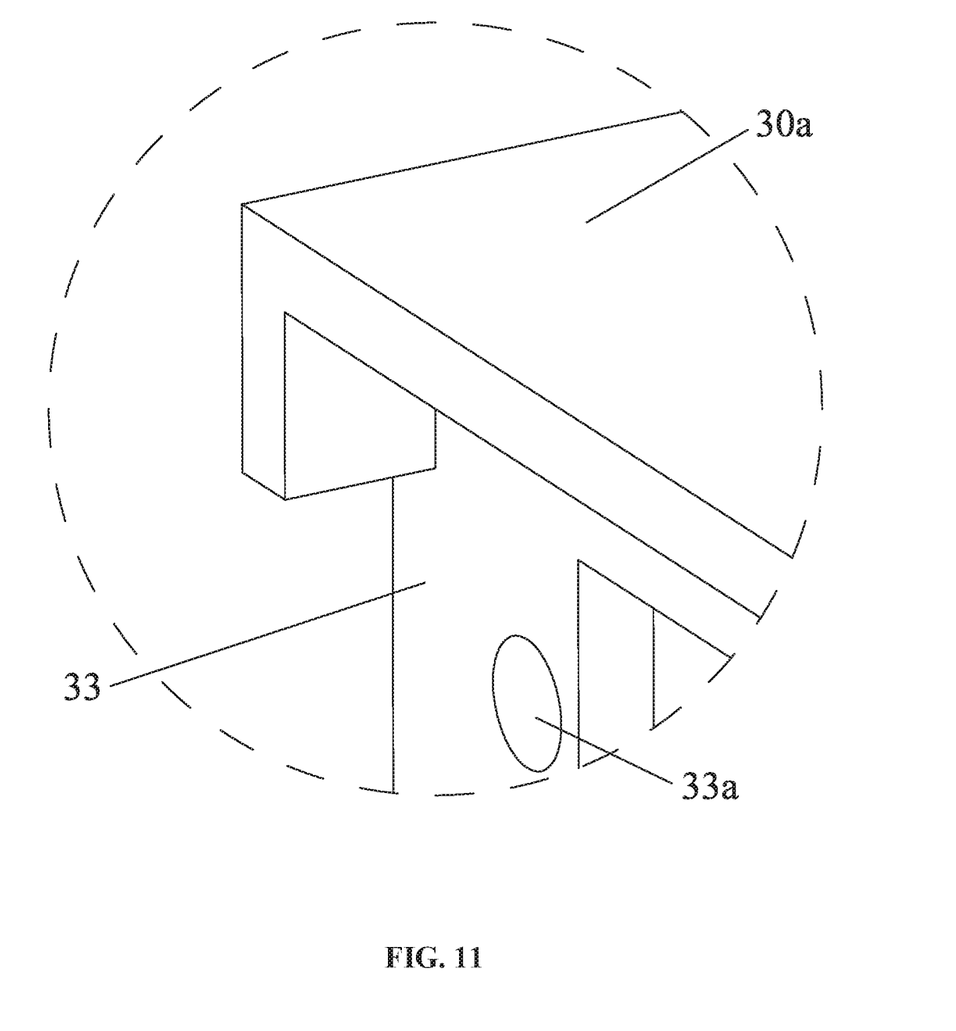
FIG. 11 is a local enlarged view of part L in FIG. 1.

As shown in FIGS. 2 and 7, the tank 1 comprises an upper body 10, a first lower body 11, and a second lower body 12; a filling valve 13, a pressure relief valve 14, a safety valve 15, a filling tube 16, a pressure relief tube 17, and a piezometer tube 18 are disposed on the upper body 10. The components are made of stainless steel with corrosion resistance and low temperature resistance. Each of the upper body 10, the first lower body 11, and the second lower body 12, is cylindrical, and two ends thereof are a spherical closed structure. The bodies communicate with each other and welded together to form the tank. The cross section of the tank is something like an isosceles trapezoid, so that the tank has the maximum container loading under certain pressure. As shown in FIG. 11, the filling tube 16, the pressure relief tube 17 and the piezometer tube 18 vertically run through the top of the upper body 10, and both sides of the joints are welded. The filling valve 13 and safety valve 15 are connected to the filling tube 16. In the process of filling cryogenic liquid fluid to the tank, the filling valve 13 is adapted to adjust the filling flow of the liquid; in case of emergency response, the safety valve 15 can be shut off to close the filling pipe 16. The pressure relief valve 14 is connected to the pressure relief tube 17 to adjust the pressure difference between the inside and outside of the tank. In practical use, a hose can be connected to the filling pipe 16 and the pressure relief pipe 17 as needed to extend the length thereof.

Figure 8:
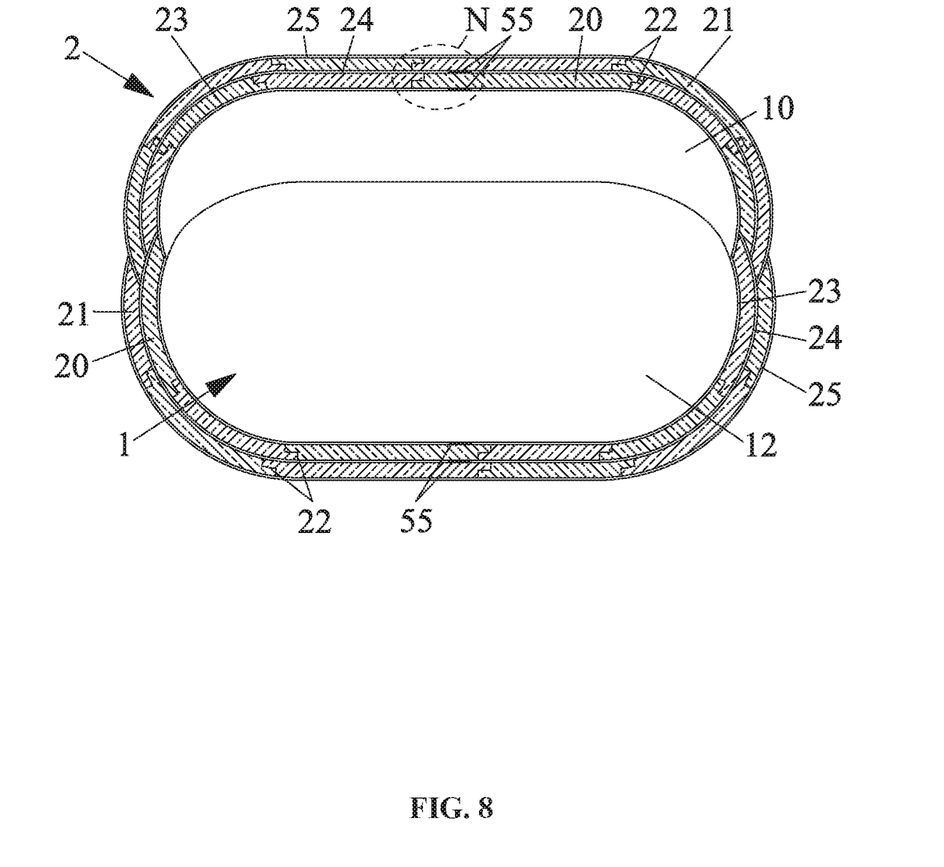
FIG. 8 is a side sectional view of a thermal insulator in FIG. 1.
Figure 9:
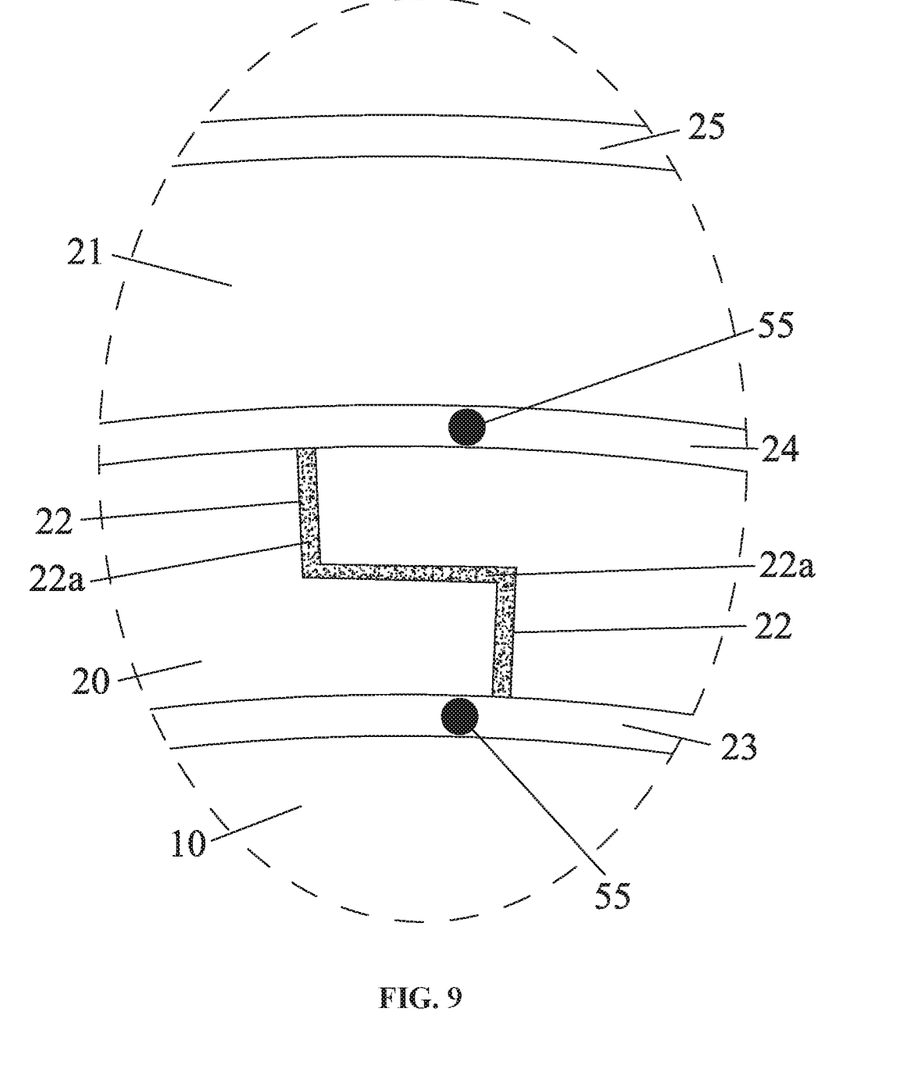
FIG. 9 is a local enlarged view of part M in FIG. 7.
Figure 10:
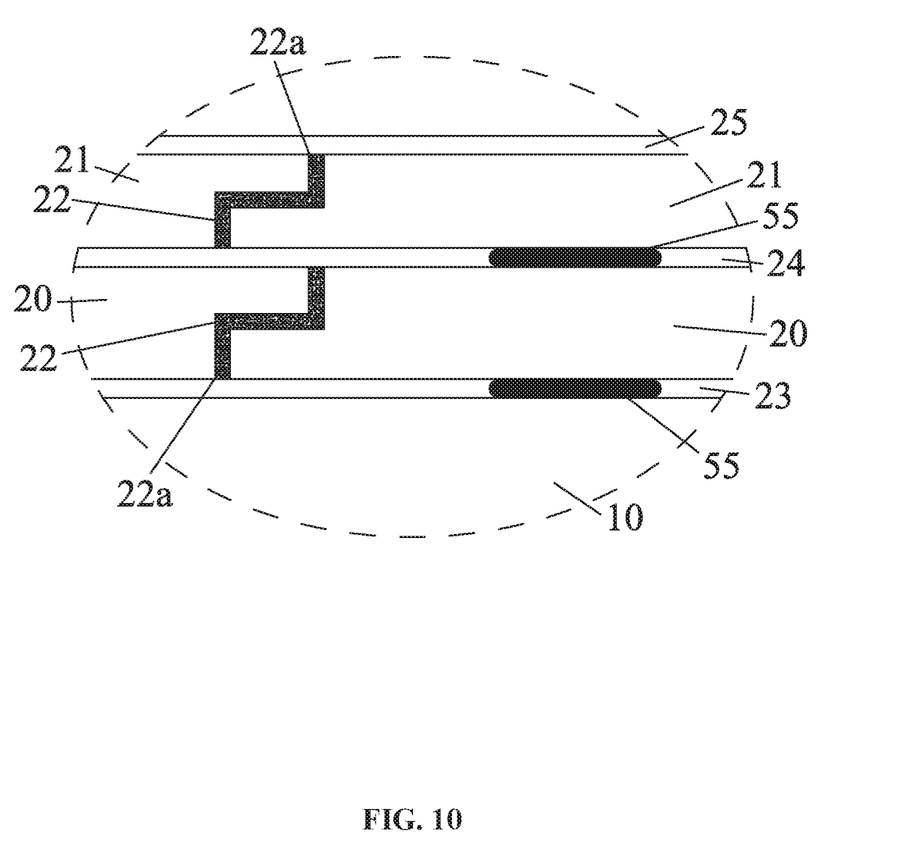
FIG. 10 is a local enlarged view of part N in FIG. 8.
Figure 14:
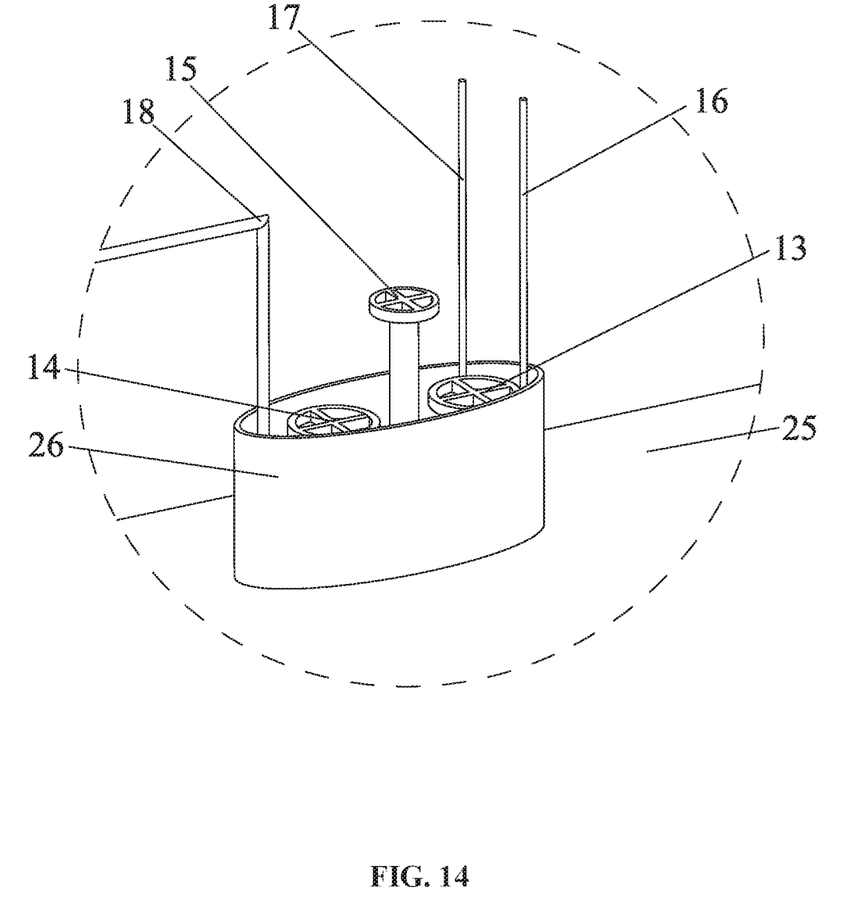
FIG. 14 is a local enlarged view of part J in FIG. 1.

As shown in FIGS. 7-8, the thermal insulator 2 comprising a first thermal insulation layer 20, a second thermal insulation layer 21, a first membrane 23, a second membrane 24, a third membrane 25, and a fence 26. The first membrane 23 is evenly disposed on the outer surface of the tank 1 to prevent corrosion of the surface of the tank 1. A plurality of step joints 22 are disposed in the first thermal insulation layer 20 and the second thermal insulation layer 21; the plurality of step joints 22 each comprises a cavity filled with a filler 22*a* (as shown in FIGS. 9-10). In addition to connecting the thermal insulation layers, the plurality of step joints 22 can block the air channel thereby improving the insulation effect of the insulation layer. The insulation layer in the same layer has the same thickness and material. The insulation layer of different layers can adopt different insulation materials with different characteristics. The first thermal insulation layer 20 can comprise multiple layers, and the second thermal insulation layer 21 can comprise impact resistant materials. In the process of heat preservation characteristic test, the thermal insulation layers of the tank need to be removed layer by layer from outside to inside. Therefore, the second membrane 24 is disposed between the first and second thermal insulation layers. The second membrane 24 is made of film material, which can avoid the adhesion between the first and second thermal insulation layers and protect a plurality of temperature sensors 55 secured to the first membrane 23 and the second membrane 24 (as shown in FIGS. 9 and 10). The third membrane 25 comprises a moisture-proof tarpaulin. The first membrane 23, the second membrane 24, and the third membrane 25 can block the air circulation between the first and second thermal insulation layers. As shown in FIG. 14, the fence 26 is arranged on the top of the thermal insulator to protect the filling valve 13, the pressure relief valve 14, the safety valve 15, the filling pipe 16, the pressure relief pipe 17, and the piezometer tube 18.

Figure 12:
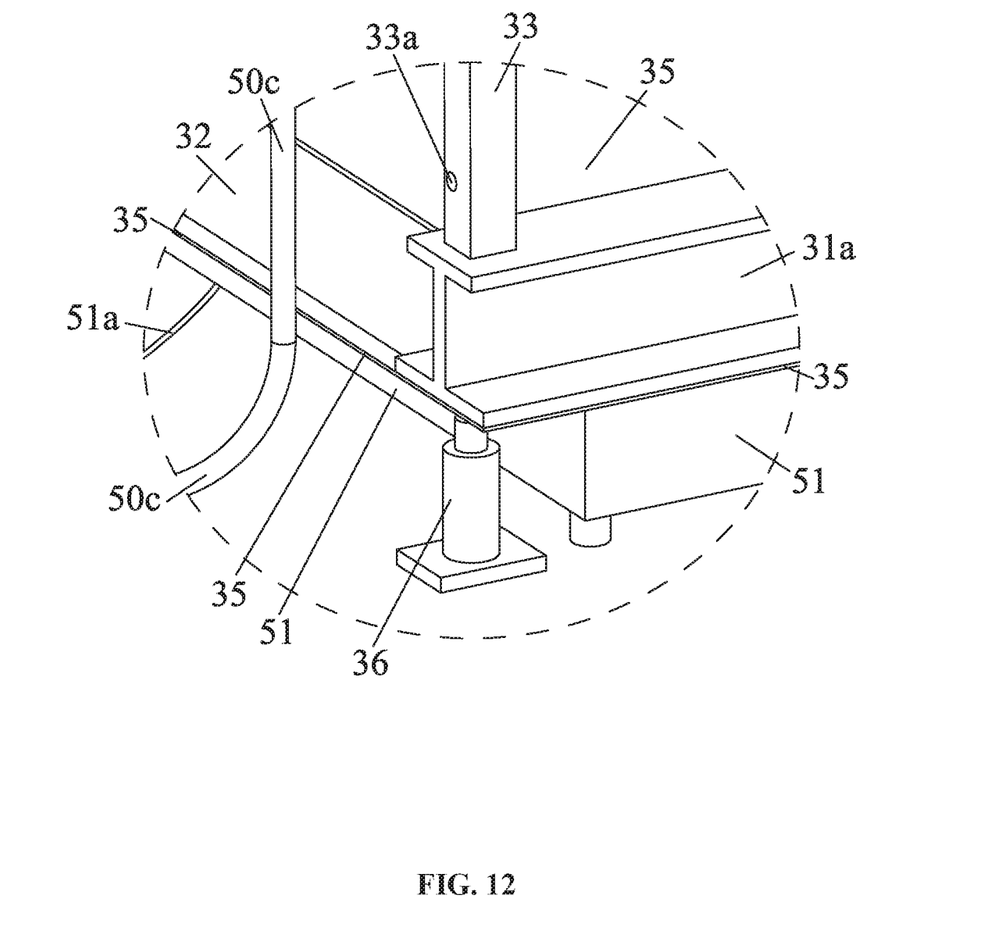
FIG. 12 is a local enlarged view of part I in FIG. 1.

As shown in FIGS. 1, 11 and 12, the cuboidal frame 3 comprises two transverse steel plates 30, two longitudinal steel plates 30*a*, two transverse H-shaped beams 31, two longitudinal H-shaped beams 31*a*, two transverse vertical plates 32, four angle steels 33 each comprising a plurality of bolt holes 33*a*, a ladder 34, a base plate 35, four jacks 36, and four toughened transparent glass plates 37. The two transverse steel plates 30 and the two longitudinal steel plates 30*a* are connected to form a first rectangular frame. The two transverse H-shaped beams 31 are disposed between the two longitudinal H-shaped beams 31*a*, Two ends of the two longitudinal H-shaped beams 31*a* are provided with the two transverse vertical plates 32, respectively. The base plate 35 is disposed below a frame formed by the two longitudinal H-shaped beams 31*a* and the two transverse vertical plates 32 (as shown in FIG. 12) to function as an under frame to collect liquid. The four angle steels 33 are disposed between the first rectangular frame and the second rectangular frame. Thus, the thermal insulation property measuring device is a skid-mounted structure. The components are made of high strength stainless steel with corrosion resistance, such as folded steel (as shown in FIG. 11), angle steel and H-shaped steel profiles (as shown in FIG. 12) to ensure the stability of the cuboidal frame 3. The ladder 34 is movable between the first and second rectangular frames and suspended on the cuboidal frame 3 for the operators to climb up to the top of the cuboidal frame 3. Under non-measurement condition, the four jacks 36 are disposed below the four bottom corners of the longitudinal H-shaped beam 31*a* to support the cuboidal frame 3 and the support bracket 4, the tank 1 and the thermal insulator 2. In the measuring condition, the four jacks 36 are removed, and the transverse H-shaped beams 31 are located on the weighing machine 51. As needed, four toughened transparent glass plates 37 are fixed on four facades of the cuboidal frame 3 via the bolt holes on the four angle steels 33.

Figure 13:
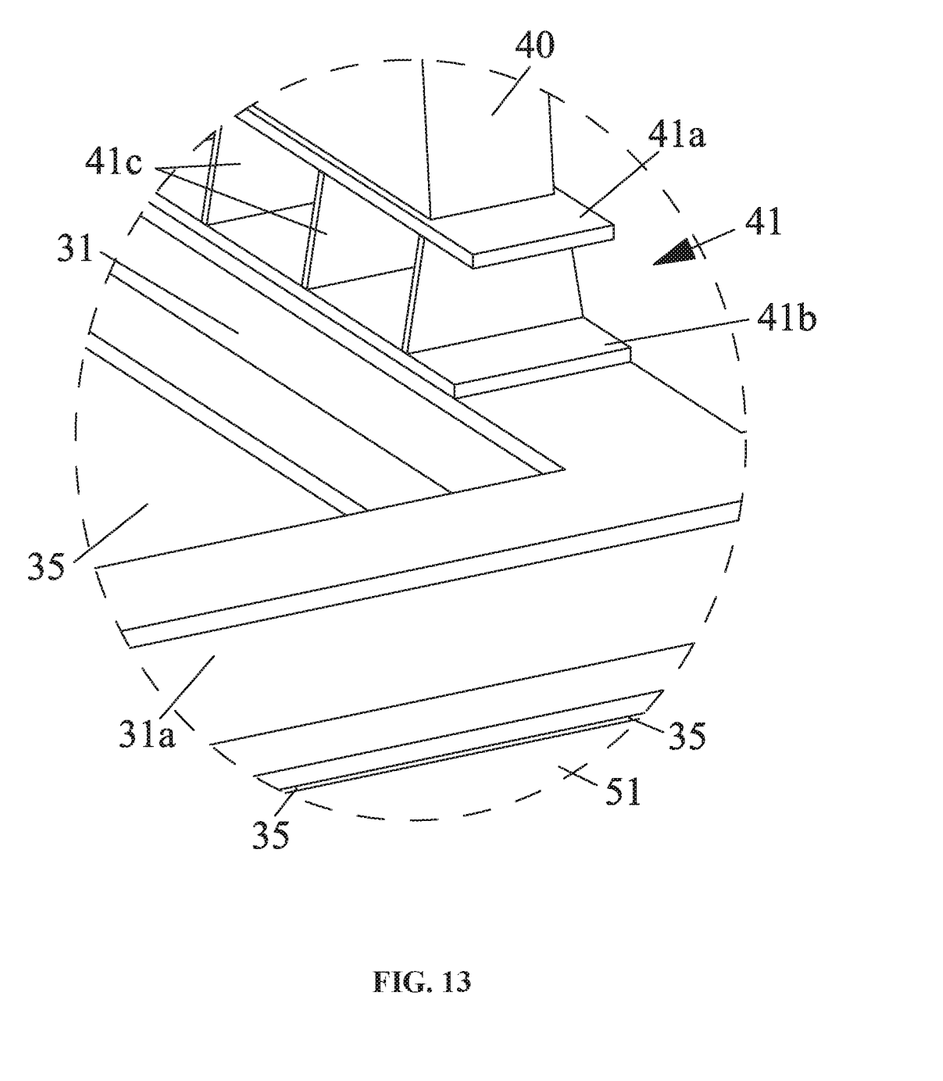
FIG. 13 is a local enlarged view of part H in FIG. 1.

As shown in FIGS. 1 and 13, the support bracket 4 comprises two trapezoidal supports 40 and two transition supports 41, The two trapezoidal supports 40 are disposed on the two transition supports 41, and due to the principle of thermal expansion and cold contraction, a small amount of drift is allowed therebetween. The tank 1 is supported by the two trapezoidal supports 40. The two transition supports 41 are disposed on the two transverse H-shaped beams 31, respectively, and the contact surface therebetween is a pitted surface (high roughness) thereby preventing the relative sliding between the two transition supports 41 and the two transverse H-shaped beams.

The two trapezoidal supports 40 are made of high-grade hardwood, which has the characteristics of low thermal conductivity, high strength and corrosion resistance. The two transition supports 41 each comprise a faceplate 41a, a baseboard 41b, and a plurality of vertical plates 41c disposed between the faceplate 41a and the baseboard 41b. In this way, the structural strength of the two transition supports 41 is improved, and the thermal conductivity is reduced. The two transition supports are made of high-quality wood or special hard plastic, with the characteristics of low thermal conductivity, high strength and corrosion resistance.

As shown in FIGS. 1, 7, 8, 9, and 10, the data collector 5 comprises a table 50d, a computer 50 disposed on the table, a first hub 50a, a second hub 50b, a plurality of threading pipes 50c, a weighing machine 51, a weight signal wire 51a, a camera 52, a video antenna 52a, a pressure gauge 53, a pressure signal wire 53a, a thermometer 54, a temperature signal wire 54a, a plurality of temperature sensors 55, a first group of signal wires 55a, and a second group of signal wires 55b. The computer 50 is placed on the table 50d. Before the test starts, the computer calibrates all measuring equipment; during the test, the computer analyzes and stores the data; after the test, the computer backs up the test data and reports the test result. In the test and measurement of the thermal insulation characteristics, the values of weight, temperature, pressure and video signals are collected and recorded in real time, and the data are processed and analyzed by the software of the computer 50. The wireless signal is directly transmitted to the computer 50, and the wired signal is collected and transmitted to the computer 50 through the first hub 50a and the second hub 50b. The first upper hub 50a is placed on the top of the cuboidal frame 3 and close to an upper measuring point; the second hub 50b is placed on the ground and close to the computer 50. The plurality of threading pipes 50c connects the first and second hubs, and the signal wires are self-shielded. The wiring mode is simple in structure and convenient in maintenance. The second hub 50b collects all the wired signals and transmits them to the computer 50. The camera 52 is placed on the top of the cuboidal frame 3 to capture the image information of the test process, which is transmitted to the computer 50 through the video antenna 52a of the camera 52.

The weighing machine 51 is stably placed on the ground below the cuboidal frame 3, and when the cuboidal frame 3 is located on the weighing machine 51, the weight information is transmitted to the second hub 50b through the weight signal wire 51a. The pressure gauge 53 is placed on the top of the cuboidal frame 3 to detect the pressure in the tank 1 with the piezometer tube 18, and transmits the pressure value to the first huh 50a through the pressure signal wire 53a.

The thermometer 54 is also placed on the top of the cuboidal frame 3, which measures the ambient temperature and transmits the ambient temperature value to the first hub 50a via the temperature signal wire 54a. In addition to measuring the ambient temperature, the plurality of temperature sensors 55 is used to measures the temperature gradient in the thermal insulator 2. The plurality of temperature sensors 55 is embedded in the first membrane 23 and the second membrane 24 of the thermal insulator 2 (as shown in FIGS. 9 and 10) of the tank 1, and the data leads thereof are summarized to the first group of signal wires 55a or the second group of signal wires 55b through the plurality of step joints 22.

To ensure the reliable measurement of the temperature gradient data in the thermal insulator 2, the plurality of temperature sensors 55 in the thermal insulator 2 is symmetrically arranged on the left and right sides of the tank (as shown in FIG. 7). Time data leads of the temperature sensors 55 arranged on the left side are summarized to the first group of signal wires 55a, and the data leads of the temperature sensors 55 arranged on the right side are summarized to the second group of signal wires 55b. Time first group of signal wires 55a and the second group of signal wires 55b are connected to the first huh 50a for data transmission. The plurality of temperature sensors 55 and its data leads in the thermal insulator 2 have the properties of low temperature resistance, corrosion resistance and self-shielding.

It will be obvious to those skilled in the art that changes and modifications may be made, and therefore, the aim in the appended claims is to cover all such changes and modifications.

What is claimed is:

1. A device, comprising:
   a tank comprising an upper body, a first lower body, and a second lower body;
   a thermal insulator comprising a first thermal insulation layer, a second thermal insulation layer, a first membrane, a second membrane, and a third membrane;
   a cuboidal frame comprising a first rectangular frame, a second rectangular frame, four angle steels connecting the first rectangular frame and the second rectangular frame, a base plate disposed below the second rectangular frame, four jacks respectively disposed on four corners of the second rectangular frame, and a ladder disposed between the first rectangular frame and the second rectangular frame;
   a support bracket comprising a trapezoidal support and a transition support; and
   a data collector comprising a table, a computer disposed on the table, a first hub, a second hub, a weighing machine, a camera, a pressure gauge, a thermometer, and a plurality of temperature sensors;
   wherein:
   the tank is disposed on the support bracket; the support bracket is disposed in the cuboidal frame;
   the upper body, the first lower body, and the second lower body are spherical and communicate with each other;
   the thermal insulator is disposed on the tank;
   the upper body is provided with a filling tube, a pressure relief tube and a piezometer tube;
   the first membrane is disposed on the tank; the first thermal insulation layer is coated on the first membrane; the second membrane is coated on the first thermal insulation layer; the second thermal insulation layer is coated on the second membrane; and the third membrane is coated on the second thermal insulation layer;
   the second rectangular frame comprises a transverse H-shaped beam and a longitudinal H-shaped beam;
   the transition support is disposed on the transverse H-shaped beam; the trapezoidal support is disposed on the transition support; the tank is disposed on the trapezoidal support; and
   the first hub, the camera, the pressure gauge, and the thermometer are disposed on the first rectangular frame; the weighing machine is disposed below the second rectangular frame; the plurality of temperature sensors is secured to the first membrane and the second membrane; the pressure gauge, the thermometer, and the plurality of temperature sensors are connected to the first hub; the weighing machine and the first hub are connected to the second hub; the second hub is connected to the computer; and the pressure gauge is connected to the piezometer tube.

2. The device of claim 1, wherein a plurality of step joints are disposed in the first thermal insulation layer and the second thermal insulation layer; the plurality of step joints each comprises a cavity filled with a filler; the first thermal insulation layer comprises multilayered materials; the second thermal insulation layer comprises an impact resistant material; the second membrane comprises a thin film material; the third membrane comprises a tarpaulin; a fence is disposed on an upper body of the thermal insulator; one end of the filling tube, one end of the pressure relief tube and one end of the piezometer tube are disposed in the fence; and a filling valve, a pressure relief valve, and a safety valve are disposed in the fence and are connected to the filling tube, the pressure relief tube, and the piezometer tube, respectively.

3. The device of claim 1, wherein the first rectangular frame comprises two transverse steel plates and two longitudinal steel plates; the second rectangular frame comprises two longitudinal H-shaped beams and two transverse vertical plates; the transverse H-shaped beam is disposed between the two longitudinal H-shaped beams; the four angle steels each comprise a plurality of bolt holes; and four toughened transparent glass plates are fixed on four facades of the cuboidal frame via the plurality of bolt holes.

4. The device of claim 1, wherein the trapezoidal support comprises a plurality of cemented hardwood blocks; the transition support comprises wood or hard plastics; and the transition support comprises a faceplate, a baseboard, and a plurality of vertical plates disposed between the faceplate and the baseboard.

* * * * *